(12) United States Patent
Chen et al.

(10) Patent No.: US 7,068,502 B2
(45) Date of Patent: Jun. 27, 2006

(54) MOUNTING APPARATUS FOR DISK DRIVE DEVICES

(75) Inventors: Yun Lung Chen, Tu-chen (TW); Chuan Min Shi, Shenzhen (CN); Zhou Xu, Shenzhen (CN)

(73) Assignees: Hong Fu Jin Precision IND(Shenzhen) Co., Ltd., Shenzhen (CN); Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/930,135

(22) Filed: Aug. 30, 2004

(65) Prior Publication Data

US 2005/0141189 A1    Jun. 30, 2005

(30) Foreign Application Priority Data

Aug. 29, 2003    (TW) .............................. 92215705 U

(51) Int. Cl.
*G06K 1/16*    (2006.01)
(52) U.S. Cl. ...................................... 361/685; 312/333
(58) Field of Classification Search ................ 361/685; 312/332.1, 333
See application file for complete search history.

(56) References Cited

U.S. PATENT DOCUMENTS

| | | | | |
|---|---|---|---|---|
| 4,979,909 A | * | 12/1990 | Andrews | .................... 361/685 |
| 5,481,431 A | * | 1/1996 | Siahpolo et al. | ............ 361/685 |
| 6,396,686 B1 | * | 5/2002 | Liu et al. | ..................... 361/685 |
| 6,616,106 B1 | * | 9/2003 | Dean et al. | .................. 361/685 |
| 6,667,880 B1 | * | 12/2003 | Liu et al. | ..................... 361/685 |
| 6,798,653 B1 | * | 9/2004 | Chen et al. | .................. 361/685 |

FOREIGN PATENT DOCUMENTS

TW            285393            4/1992

* cited by examiner

*Primary Examiner*—Lisa Lea-Edmonds
(74) *Attorney, Agent, or Firm*—Wei Te Chung

(57) ABSTRACT

A mounting apparatus for disk drive devices includes a bracket (30), an operation member (50), and a pair of rails (70). The bracket has a first sidewall (34) and a second sidewall (36) each defining a first retaining hole (342, 362) and a second retaining hole (346, 366). The second sidewall has a protrusion (42). The operation member is slidably mounted on the second sidewall. A hook (66) is formed on the operation member corresponding to the protrusion of the bracket. Each rail protrudes two locating posts (74) corresponding to the first and second retaining holes. In assembly, the operation member is in a holding position in which the locating posts of the rails are retained in the corresponding first and second retaining holes and the hook clasps the protrusion. In disassembly, the operation member is in a released position, and the hook is released from the protrusion.

13 Claims, 6 Drawing Sheets

MOUNTING APPARATUS FOR DISK DRIVE DEVICES

BACKGROUND OF THE INVENTION

1. Field of the Invention

The present invention relates to mounting apparatuses, and particularly to a mounting apparatus for mounting disk drive devices to computer enclosures.

2. Description of Related Art

In the enclosure of a typical personal computer, there are generally two disk drive brackets mounted therein. Usually, a variety of disk drives are received in the disk drive brackets, which are then secured into the enclosure. There are many ways to secure the disk drive brackets in the enclosure. One way is by using screws. A pair of joining edges is formed on opposite sides of a bottom of a lower disk drive bracket. Fixing holes are defined in the joining edges. The lower disk drive bracket is secured to a bottom of an upper disk drive bracket by screws. However, this way of securing the disk drive brackets is unduly painstaking and time-consuming. Disassembly of the disk drive brackets is similarly painstaking and time-consuming.

Another way to secure the disk drive brackets in the enclosure is by using hooks. An example of a pertinent mounting apparatus for disk drive devices is disclosed in Taiwan patent application No. 81205427. One side of a first disk drive bracket has a plurality of L-shaped flanges and a plurality of L-shaped projections. A corresponding side of a second disk drive bracket has a plurality of L-shaped projections and a plurality of L-shaped flanges, respectively corresponding to the L-shaped flanges and L-shaped projections of the first disk drive bracket. Each flange fastens to the corresponding projection, thus securing the second disk drive bracket to the first disk drive bracket. This mounting apparatus does not need screws. However, the disk drive brackets must be assembled by hand inside the computer enclosure. Thus makes the assembly operation inconvenient, and increases the risk of accidental damage to other components such as sensitive electronic components inside the computer enclosure.

An improved mounting apparatus for disk drive devices which overcomes the above-mentioned problems is desired.

BRIEF SUMMARY OF THE INVENTION

Accordingly, an object of the present invention is to provide a mounting apparatus for conveniently mounting disk drive devices to a computer enclosure.

To achieve the above-mentioned objects, a mounting apparatus for disk drive devices of the present invention comprises a bracket, an operation member, and a pair of rails. The bracket has a first sidewall and a second sidewall each defining a first retaining hole and a second retaining hole. The second sidewall has a protrusion. The operation member is slidably mounted on the second sidewall. A hook is formed on the operation member corresponding to the protrusion of the bracket. Each rail protrudes two locating posts corresponding to the first and second retaining holes. In assembly, the operation member is in a holding position in which the locating posts of the rails are retained in the corresponding first and second retaining holes and the hook clasps the protrusion. In disassembly, the operation member is in a released position, and the hook is released from the protrusion.

Other objects, advantages and novel features of the present invention will be drawn from the following detailed description of a preferred embodiment of the present invention with the attached drawings, in which:

DETAILED DESCRIPTION OF THE INVENTION

Figure 1:
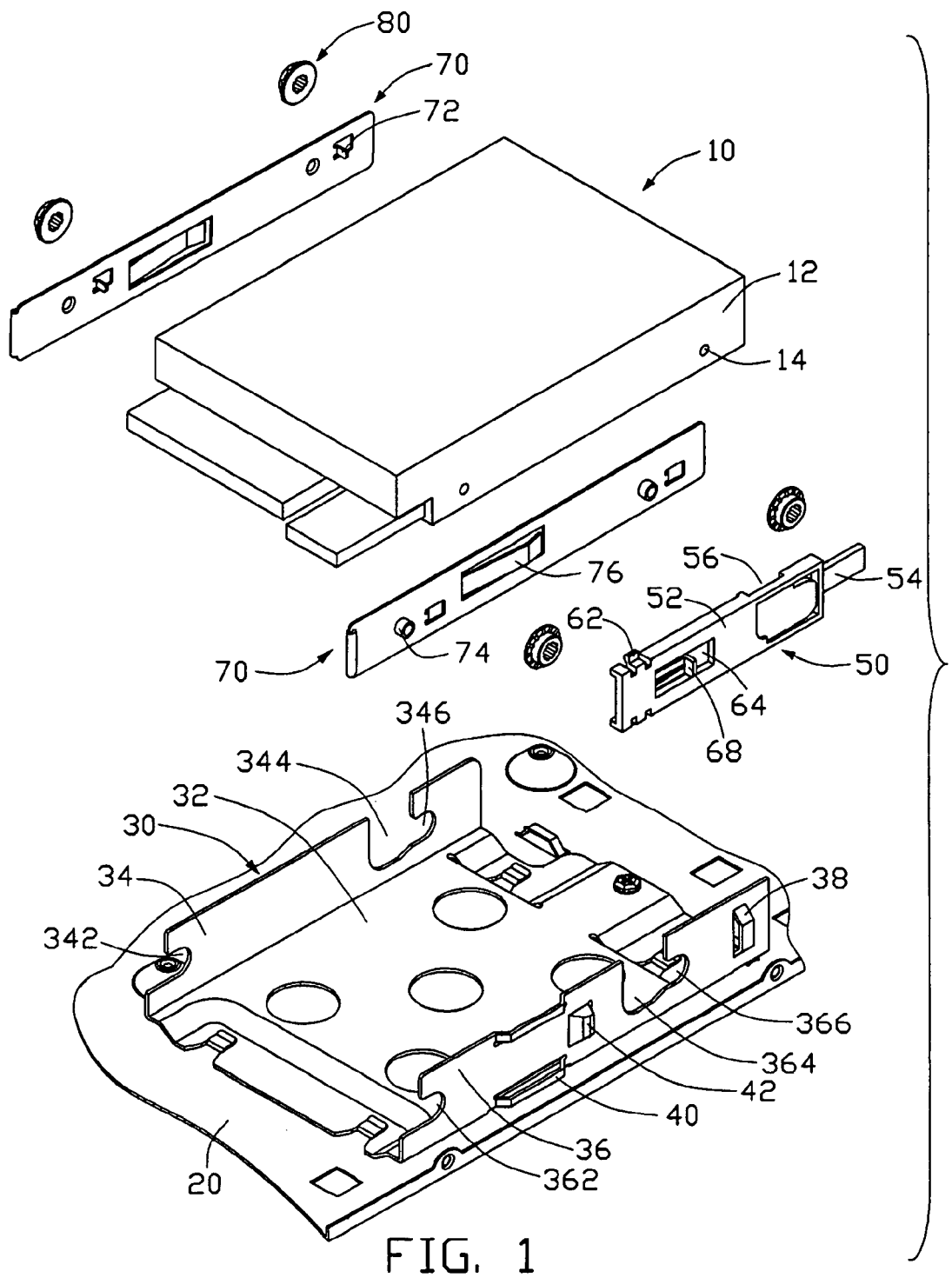
FIG. 1 is an exploded isometric view of a mounting apparatus for disk drive devices in accordance with the preferred embodiment of the present invention, together with a disk drive.
Figure 2:
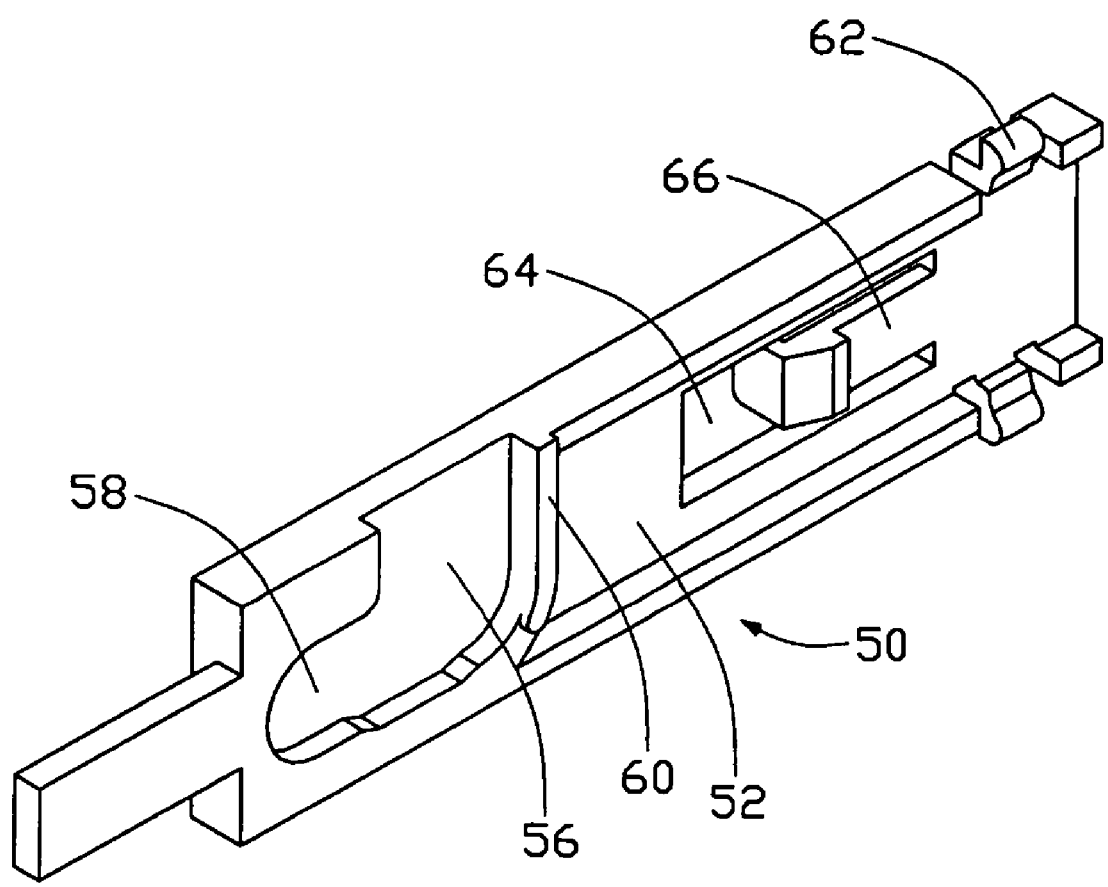
FIG. 2 is a perspective view of an operation member of the mounting apparatus of FIG. 1, but viewed from another aspect.

Referring to FIGS. 1 and 2, a mounting apparatus in accordance with a preferred embodiment of the present invention for securing a disk drive 10 to a computer enclosure (a mounting wall 20 of the enclosure shown only), comprises a bracket 30, an operation member 50, a pair of rails 70 and four rubber gaskets 80.

The disk drive 10 has two parallel sidewalls 12. Two fixing holes 14 are defined in each of the sidewalls 12.

The bracket 30 comprises a bottom wall 32 mounted on the mounting wall 20 of the computer enclosure, a first sidewall 34 and a second sidewall 36 bent upwardly from opposite sides of the bottom wall 32. The first sidewall 34 and the second sidewall 36 each define a first retaining hole 342, 362 at one corresponding ends, a vertical slot 344, 366 at opposite ends. Two second retaining hole 346, 366 are defined at the ends of the slots 344, 366 of the first sidewall 34 and second sidewall 36 respectively. The second sidewall 36 forms a retaining portion 38 at the end near the second retaining hole 366, and two parallel guiding flakes 40 between the first retaining hole 362 and the slot 364. A protrusion 42 protrudes from the second sidewall 36 between the guiding flakes 40 and the slot 364, having a vertical surface facing the slot 364 and a slanting surface facing the first retaining hole 362.

The operation member 50 mounted on the second sidewall 36 of the bracket 30, comprises a long broad body 52 and a narrow traversable end 54 extending horizontally from one end of the body 52, corresponding to the retaining portion 38 of the second sidewall 36. A recess 56 is defined in the body 52 of the operation member 50 corresponding to the slot 364 of the second sidewall 36. A groove 58 is defined in the body 52 at a bottom end of the recess 56 corresponding to the second retaining hole 366 of the second sidewall 36 of the bracket 30, and a blocking portion 60 at one side of the recess 56. The operation member 50 forms two L-shaped sliding portion 62 at a top and a bottom of the body 52 respectively, corresponding to the guiding flakes 40 of the second sidewall 36 of the bracket 30. An opening 64 is defined in the body 52 between the blocking portion 60 and the sliding portion 62. A hook 66 protrudes from the body 52 into the opening 64, with a handle 68 protruding outwardly at a free end.

Each of the pair of rails 70 is made of a single metal sheet. Each of the rails 70 comprises two locating pins 72 protruding therefrom toward the disk drive 10, and two locating posts 74 protruding therefrom opposite to the locating pins 72. A grounding slice 76 is formed on each of the rails 70.

Figure 3:
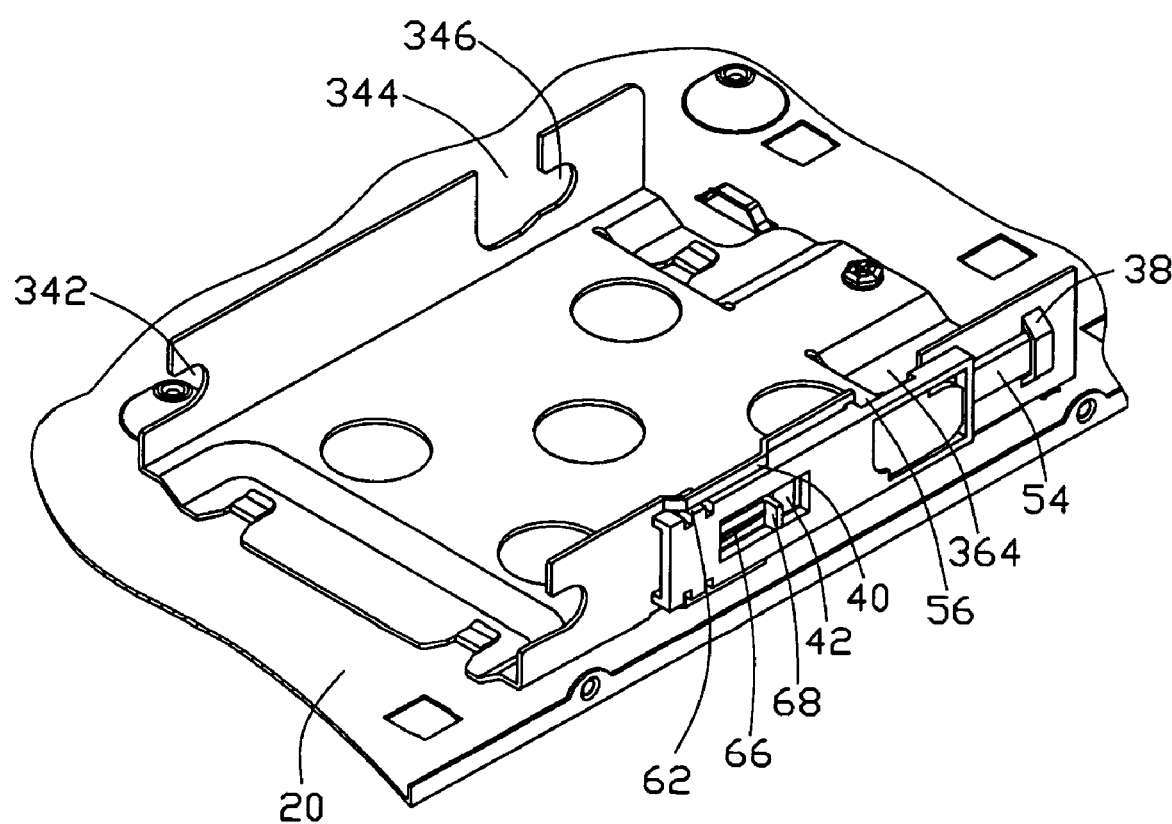
FIG. 3 is an assembled view of a bracket and the operation member of the mounting apparatus of FIG. 1.

Referring to FIG. 3, in assembling the operation member 50 to the second sidewall 36 of the bracket 30, firstly, the traversable end 54 of the operation member 50 is retained in the retaining portion 38 of the second sidewall 36 of the bracket 30. Then, the sliding portions 62 of the operation member 50 are pressed to contract, for being mounted into the guiding flakes 40 of the second sidewall 36. The sliding portions 62 can horizontally slide on the guiding flakes 40, thus the operation member 50 is slidably mounted on the second sidewall 36 of the bracket 30.

Figure 4:
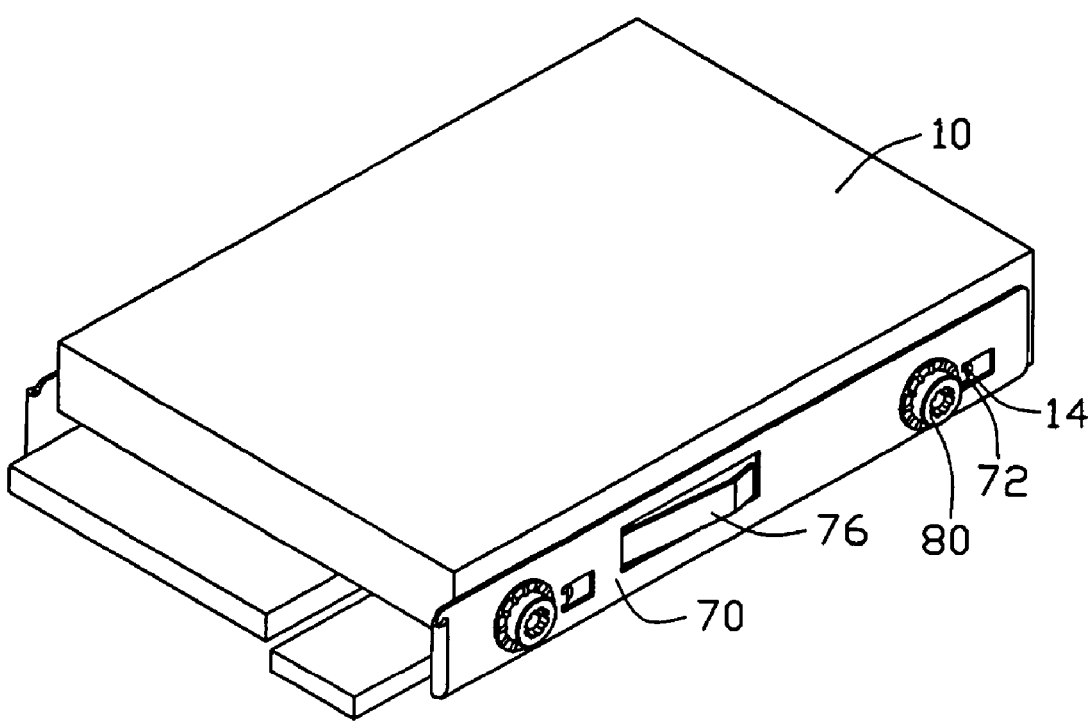
FIG. 4 is an assembled view of the disk drive, and two rails with gaskets mounted thereon of the mounting apparatus of FIG. 1.
Figure 5:
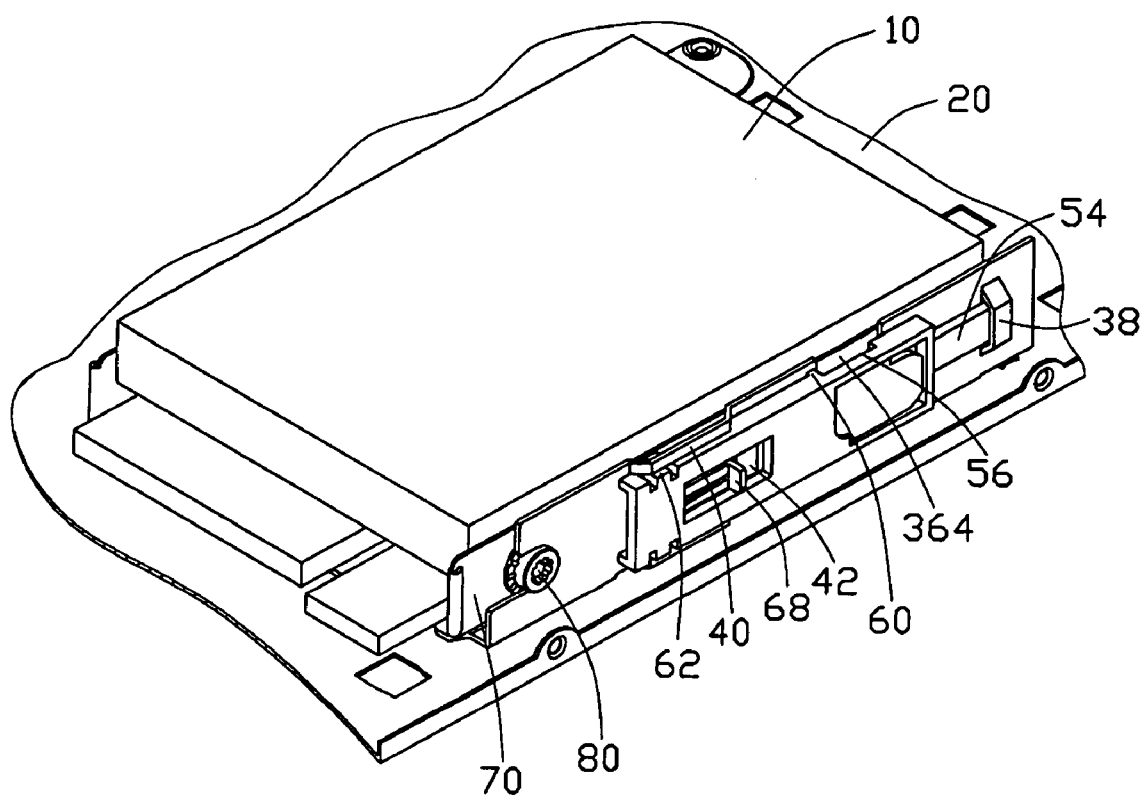
FIG. 5 is an assembled view of FIG. 1, but showing the process of attaching the disk drive to the mounting apparatus.
Figure 6:
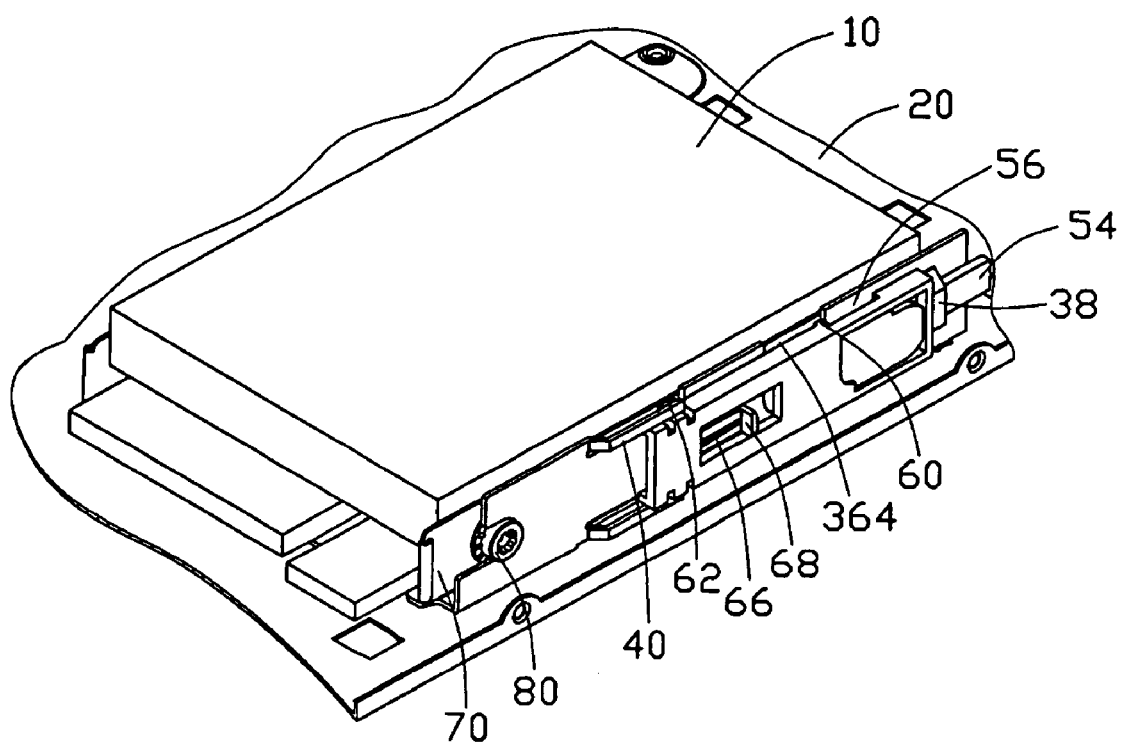
FIG. 6 is an assembled view of FIG. 1.

Referring also to FIGS. 4–6, in assembly, the locating pins 72 of the rails 70 are inserted into the fixing holes 14 of both sidewalls 12 of the disk drive 10 to secure the rails 70 to the disk drive 10. The rubber gaskets 80 are set around the locating posts 74 for good quakeproof. When the hook 66 of the operation member 50 is located facing the slanting surface of the protrusion 42, the recess 56 of the operation member 50 is located facing the slot 364 of the second sidewall 36 of the bracket 30, and the groove 58 is located facing the second retaining hole 366 of the second sidewall 36. In this time, the operation member 50 is located in a first position.

When the operation member 50 is located in the first position, the disk drive 10 with the rails 70 and the rubber gaskets 80 is placed in the bracket 30, with the posts 74 set around the rubbers gaskets 80 of the rails 70 sliding in the slots 344, 346. The combined disk drive 10, rails 70 and gaskets 80 is pushed till the posts 74 set around the rubbers gaskets 80 of the rails 70 are retained in the first retaining holes 342, 362 and the second retaining holes 346, 366. Then, the operation member 50 is pushed till the hook 66 rides along the slanting surface of the protrusion 42 and snappingly engages with the vertical surface of the protrusion 42, therefore clasping the protrusion 42. The blocking portion 60 abuts against the locating post 74 and the gasket 80 located in the second retaining hole 366. The body 52 of the operation member 50 is prevented from further moving by the retaining portion 38 of the second sidewall 36. Thus, the disk drive 10 is secured in the bracket 30. In this time, the operation member 50 is located in a second position. Simultaneously, the grounding slices 76 of the rails 70 abut against the second sidewall 36 of the bracket 30 for good grounding.

In disassembly, firstly, the handle 68 of the operation member 50 is pushed to make the hook 66 disengage from the protrusion 42 of the second sidewall 36 of the bracket 30. Then, the operation member 50 is pushed till the blocking portion disengages from the locating post 74 of the rail 70 and the rubber gasket 80 located in the second retaining hole 366. Thus, the disk drive 10 is easily taken out from the bracket 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for a disk drive device, the mounting apparatus comprising:
   a bracket having a first sidewall and a second sidewall, the first sidewall and the second sidewall each defining a first retaining hole at one end and a second retaining hole at an opposite end, the second sidewall having a protrusion protruding therefrom between the first retaining hole and the second retaining hole;
   an operation member slidably mounted on the second sidewall, the operation member forming a hook thereon corresponding to the protrusion of the second sidewall of the bracket, and a blocking portion corresponding to the second retaining hole of the second sidewall of the bracket; and
   a pair of rails mounted on both sidewalls of the disk drive device, each of the rails protruding two locating posts corresponding to the first and second retaining holes of the bracket,
   wherein when the combined disk drive device and rails is placed in the bracket, the locating posts of the rails slide in the corresponding first and second retaining holes of the bracket, the operation member is pushed till the hook of the operation member engages with the protrusion of the second sidewall of the bracket, and the blocking portion of the operation member abuts against a corresponding locating post of one of the rails.

2. The mounting apparatus as described in claim 1, wherein each of the sidewalls of the disk drive defines two fixing holes, each of the rails comprises two locating pins protruding therefrom toward the disk drive corresponding to the fixing holes of the disk drive device.

3. The mounting apparatus as described in claim 1, wherein the first retaining holes are defined at edges of the first and second sidewalls of the bracket, the first and second sidewalk of the bracket each defines a slot, each of the second retaining hole is defined at ends of the corresponding slot.

4. The mounting apparatus as described in claim 1, wherein the protrusion of the second sidewall of the bracket has a vertical surface facing the second retaining hole and a slanting surface facing the first retaining hole.

5. The mounting apparatus as described in claim 4, wherein the body of the operation member defines an opening, a hook protrudes from the body into the opening, with a handle protruding outwardly at a free end.

6. The mounting apparatus as described in claim 1, wherein the operation member comprises a broad body and a narrow traversable end extending horizontally from one end of the body, the body forms two L-shaped sliding portions at top and bottom of the body respectively.

7. The mounting apparatus as described in claim 6, wherein the body defines a recess corresponding to the slot of the second sidewall of the bracket, a groove is defined in the body at a bottom end of the recess corresponding to the second retaining hole of the second sidewall of the bracket, a blocking portion is formed at one end of the recess.

8. The mounting apparatus as described in claim 6, wherein the second sidewall of the bracket forms a retaining portion near the second retaining hole corresponding to the traversable end of the operation member, and two parallel guiding flakes between the first retaining hole and the slot corresponding to the sliding portion of the operation member.

9. The mounting apparatus as described in claim 1, wherein the each of the locating posts covers a rubber gasker for good quakeproof.

10. A mounting apparatus for a disk drive device, comprising:
- a bracket having a first sidewall and a second sidewall, the first sidewall and the second sidewall each defining a first retaining hole at one end and a second retaining hole at an opposite end, the second sidewall having a protrusion protruding therefrom between the first retaining hole and the second retaining hole;
- an operation member slidably mounted on the second sidewall, the operation member forming a hook thereon corresponding to the protrusion of the second sidewall of the bracket; and
- a pair of rails mounted on both sidewalls of the disk drive device, each of the rails protruding two locating posts corresponding to the first and second retaining holes of the bracket,
- wherein the operation member is movable mounted on the second sidewall of the bracket between a holding position in which the locating posts of the rails are retained in the corresponding first and second retaining holes of the bracket and the hook of the operation member clasps the protrusion of the bracket, and a released position in which the hook is released from the protrusion.

11. A mounting apparatus assembly comprising: a data storage device assembly with a pair of studs on two opposite side faces, respectively; a bracket including a receiving cavity with a pair of side walls aside; a L-shaped slot formed in each of said side wall and in communication with an edge thereof; and an operation member moveably attached to at least one of said side walls, said operation member being moveable relative to the bracket at either a locking or a unlocking position, said operation member defining an L-shaped recess to receive the corresponding stud therein; wherein said data storage device assembly is assembled into the receiving cavity initially vertically and successively horizontally via the studs moving along the L-shaped slots, respectively, under a condition that the operation member is located in the unlocking position, and sequentially the operation member is moved from the unlocking position to the locking position to prevent the stud from moving backwardly along the corresponding slot.

12. The mounting apparatus assembly as described in claim 11, wherein said operation member is moved along a horizontal direction between the locking position and the unlocking position.

13. The mounting apparatus assembly as described in claim 11, wherein said recess is corresponded to the L-shaped slot when the operation member is moveably attached to at least one of said side walls of the bracket.

* * * * *